United States Patent
Kang et al.

(10) Patent No.: US 9,919,924 B2
(45) Date of Patent: Mar. 20, 2018

(54) POROUS CARBON AND METHOD OF PREPARING THE SAME

(71) Applicants: Hanwha Chemical Corporation, Seoul (KR); SNU R&DB Foundation, Seoul (KR)

(72) Inventors: Shin Hoo Kang, Seoul (KR); Ji Soon Ihm, Seoul (KR); Dong Ok Kim, Seoul (KR)

(73) Assignees: Hanwha Chemical Corporation (KR); SNU R&DB Foundation (KR)

( * ) Notice: Subject to any disclaimer, the term of this patent is extended or adjusted under 35 U.S.C. 154(b) by 386 days.

(21) Appl. No.: 14/417,279

(22) PCT Filed: Jul. 24, 2013

(86) PCT No.: PCT/KR2013/006638
§ 371 (c)(1),
(2) Date: Jan. 26, 2015

(87) PCT Pub. No.: WO2014/017834
PCT Pub. Date: Jan. 30, 2014

(65) Prior Publication Data
US 2015/0210547 A1    Jul. 30, 2015

(30) Foreign Application Priority Data

Jul. 27, 2012 (KR) .................. 10-2012-0082714

(51) Int. Cl.
| | | |
|---|---|---|
| C01B 31/02 | (2006.01) | |
| C01B 32/336 | (2017.01) | |
| C01G 23/00 | (2006.01) | |
| C01G 41/00 | (2006.01) | |
| C01G 1/00 | (2006.01) | |
| C01B 32/05 | (2017.01) | |

(52) U.S. Cl.
CPC .............. *C01B 31/02* (2013.01); *C01B 32/05* (2017.08); *C01B 32/336* (2017.08); *C01G 1/00* (2013.01); *C01G 23/00* (2013.01); *C01G 23/002* (2013.01); *C01G 41/006* (2013.01); *C01P 2002/72* (2013.01); *C01P 2006/12* (2013.01); *C01P 2006/14* (2013.01); *C01P 2006/16* (2013.01)

(58) Field of Classification Search
CPC ...................................................... C01B 31/02
See application file for complete search history.

(56) References Cited

U.S. PATENT DOCUMENTS

| | | | |
|---|---|---|---|
| 2,849,275 | A | 8/1958 | Bleccker |
| 5,380,688 | A | 1/1995 | Dunmead et al. |
| 5,990,041 | A | 11/1999 | Chung et al. |
| 6,214,309 | B1 | 4/2001 | Shaw et al. |
| 6,793,875 | B1 | 9/2004 | Shaw et al. |
| 2002/0097549 | A1 | 7/2002 | Maletin et al. |
| 2003/0064565 | A1 | 4/2003 | Maletin et al. |
| 2003/0172509 | A1 | 9/2003 | Maletin et al. |
| 2003/0180209 | A1 | 9/2003 | Gordeev et al. |
| 2006/0251565 | A1 | 11/2006 | Leis et al. |
| 2009/0117094 | A1 | 5/2009 | Leis et al. |
| 2009/0213529 | A1 | 8/2009 | Gogotsi et al. |
| 2009/0301902 | A1 | 12/2009 | Gogotsi et al. |
| 2012/0093709 | A1 | 4/2012 | Gogotsi et al. |

FOREIGN PATENT DOCUMENTS

| | | |
|---|---|---|
| CA | 1010844 A | 5/1977 |
| CN | 102583317 A | 7/2012 |
| JP | S5016692 A | 2/1975 |
| JP | S61151012 A | 7/1986 |
| JP | H06206780 A | 7/1994 |
| JP | H09501391 A | 2/1997 |
| JP | 2004513529 A | 4/2004 |
| JP | 2008536786 A | 9/2008 |
| JP | 2011093774 A | 5/2011 |
| KR | 20080112234 A | 12/2008 |
| KR | 20120052483 A | 5/2012 |
| WO | 99015461 A1 | 4/1999 |
| WO | 0239468 A2 | 5/2002 |
| WO | 2005118471 A1 | 12/2005 |

OTHER PUBLICATIONS

Extended European Search Report for Application No. EP13822559.4 dated Jun. 21, 2016.
G. Yushin et al: "Carbide-Derived Carbons: Effect of Pore Size on Hydrogen Uptake and Heat of Adsorption," Advanced Functional Materials, vol. 16, No. 17, Nov. 3, 2006 (Nov. 3, 2006), pp. 2288-2293.
Bo Jiang et al: "Thermodynamic Study of Titanium Oxycarbide," Metallurgical and Materials Transactions A, Springer-Verlag, New York, vol. 43 , No. 10, Feb. 8, 2012 (Feb. 8, 2012), pp. 3510-3514.
Mohammad A R Dewan et al: "Carbothermal Reduction of Titania in Different Gas Atmospheres," Metallurgical and Materials Transactions B, Springer-Verlag, New York, vol . 40, No. 1, Dec. 2, 2008 (Dec. 2, 2008), pp. 62-69.
Partial Supplementary European Search Report for Application No. EP13822559 dated Mar. 21, 2016.
International Search Report for Application No. PCT/KR2013/006638 dated Nov. 28, 2013.
Gogotsi et al. 1997 J. Mater. Chem.7:1841-1848.
Boehm et al. Proc.12th Biennial Conf. on Carbon 149-150 (Pergamon, Oxford, 1975)—Abstract Only of Reference.
Vakifahmetoglu, C., Volker, P., et al., Microporous and Mesoporous Materials, 144 (2011), pp. 105-112 "enhanced hydrogen and methane gas storage of silicon oxycarbide derived carbon".

(Continued)

*Primary Examiner* — Stuart Hendrickson
(74) *Attorney, Agent, or Firm* — Lerner, David, Littenberg, Krumholz & Mentlik, LLP (57) ABSTRACT

This disclosure relates to porous carbon and a method of preparing the same. The porous carbon of the present invention is derived from a carbide compound having a composition comprising metal and oxide. The porous carbon of the present invention comprises both micropores and mesopores, and has large specific surface area, and thus, may be usefully used in various fields.

10 Claims, 7 Drawing Sheets

(56) References Cited

OTHER PUBLICATIONS

Chen, Jin et al., Nanometer Nonmetallic Functional Material, 2007 pp. 65-66.
Yeon Sun-Hwa, Reddington, Patricia, et al., "Carbide-derived-carbons with hierarchical porosity from a preceramic polymer", Carbon vol. 48, Issue 1, 2010 p. 201-210.
Kravchik, A. E., Kukushkina, Yu. A., et al., "Structure of Nanoporous Carbon Produced from Titanium Carbide and Carbonitride" Russian Journal of Applied Chemistry 2008, vol. 81, Issue 10, pp. 1733-1739.

POROUS CARBON AND METHOD OF PREPARING THE SAME

CROSS-REFERENCE TO RELATED APPLICATION

This application is a national phase entry under 35 U.S.C. § 371 of International Application No. PCT/KR2013/006638, filed Jul. 24, 2013, which claims priority to Korean Patent Application No. 10-2012-0082714, filed Jul. 27, 2012, the disclosures of which are incorporated herein by reference.

TECHNICAL FIELD

The present invention relates to porous carbon and a method for preparing the same. More particularly, the present invention relates to highly porous carbon having large specific surface area, and a method for preparing the same. This application claims the priority of Korean Patent Application No. 10-2012-0082714 filed with the Korean Intellectual Property Office on Jul. 27, 2012, the entire contents of which are hereby incorporated by reference.

BACKGROUND OF ART

Carbon material is very useful material that is applied in many different industries such as a catalyst, a fuel cell, electrode material for a secondary cell, a super capacitor, composite materials, a gas sensor, a solar cell, various electronic devices and the like. Carbon is being applied in a great variety of forms.

Particularly, carbon fiber, carbon nanotube and the like have very excellent mechanical properties while having high conductivity, and for active carbon or amorphous carbon with very high specific surface area, due to the high porosity and stable property, a lot of studies are being progressed in the field of electrode material for a fuel cell and a secondary cell. And, it draws attention as gas storage material for fuel such as hydrocarbon and hydrogen and the like, or a separation body that can purify contaminated area or harmful gas such as carbon dioxide and the like Recently, carbide derived carbon (CDC) is studied as porous carbon material, and is receiving lots of attention (Gogotsi et al. 1997 *J. Mater. Chem.* 7:1841-1848; Boehm et al. *Proc. 12th Biennial Conf. on Carbon* 149-150 (Pergamon, Oxford, 1975). Most amorphous CDC has micropores of 2 nm or less, and thus, it was reported to selectively produce 0.6~0.9 nm pores that are ideal for hydrogen storage.

However, mesopores of 2 nm or more are also in great demand in various industries such as semiconductor or large gas storage, adsorption body of medical therapeutics or lubricant adsorbent and the like.

Recently, control of pore volume as well as control of specific surface area and pore size draws attention as more important property. Thus, in order to control pores, CDC synthesis was attempted using various raw materials. As the raw materials of CDC, most carbides such as TiC, ZrC, WC, SiC, TaC, $B_4C$, HfC, $Al_4C_3$ and the like were used, but noticeable result according to the kind of metal atoms of carbide was not obtained, and CDC that can form mesopores of 2 nm or more has not been reported yet.

DETAILED DESCRIPTION OF THE INVENTION

Technical Problem

In order to solve the problems of the prior art, it is an object of the invention to provide porous carbon with high specific surface area including micropores and mesopores.

It is another object of the invention to provide a method for preparing the porous carbon.

Technical Solution

The present invention provides porous carbon derived from a carbide compound having a composition represented by the following Formula 1:

(in the Formula 1, M is at least one metal selected from the group consisting of Ti, V, Cr, Zr, Nb, Mo, W, Hf, and Ta; X is 0.6 to 0.99, and y is 0.01 to 0.4).

The present invention also provides porous carbon derived from a carbide compound having a composition represented by the following Formula 2:

(in the Formula 2, M is at least one metal selected from the group consisting of Ti, V, Cr, Zr, Nb, Mo, W, Hf, and Ta; A is boron (B) or hydrogen (H); X is 0.6 to 0.99, y is 0.01 to 0.4, and z is 0.01 to 0.4).

The present invention also provides a method for preparing porous carbon comprising the steps of:
mixing at least one metal source selected the group consisting of metal selected from Ti, V, Cr, Zr, Nb, Mo, W, Hf, Ta, and oxides thereof with a carbon source;
heating the mixture to form a carbide compound;
reacting the carbide compound with halogen gas; and
heating the reaction mixture under hydrogen atmosphere.

ADVANTAGEOUS EFFECTS

The porous carbon of the present invention may be usefully used in various application fields requiring relatively large pores as well as in the fields requiring small pores, by including mesopores with a size of 2 nm or more together with micropores with a size less than 2 nm, And, according to the preparation method of porous carbon of the present invention, by controlling the compositional ratio of each component of a carbide compound, porous carbon having pores of various sizes and specific surface areas may be easily prepared by a simple method.

DETAILED DESCRIPTION OF THE EMBODIMENTS

The porous carbon according to one embodiment of the invention is derived from a carbide compound having a composition represented by the following Formula 1.

$$M(C_xO_y)$$ [Formula 1]

(in the Formula 1, M is at least one metal selected from the group consisting of Ti, V, Cr, Zr, Nb, Mo, W, Hf, and Ta; X is 0.6 to 0.99, and y is 0.01 to 0.4).

The porous carbon according to another embodiment of the invention is derived from a carbide compound having a composition represented by the following Formula 2:

$$M(C_xO_yA_z)$$ [Formula 2]

(in the Formula 2, M is at least one metal selected from the group consisting of Ti, V, Cr, Zr, Nb, Mo, W, Hf, and Ta; A is boron (B) or hydrogen (H); X is 0.6 to 0.99, y is 0.01 to 0.4, and z is 0.01 to 0.4).

And, the preparation method of porous carbon according to one embodiment of the invention comprises the steps of: mixing at least one metal source selected the group consisting of metal selected from Ti, V, Cr, Zr, Nb, Mo, W, Hf, Ta, and oxides thereof with a carbon source; heating the mixture to form a carbide compound; reacting the carbide compound with halogen gas; and heating the reaction mixture under hydrogen atmosphere.

Hereinafter, porous carbon and a method for preparing the same according to the present invention will be explained in detail with reference to drawings.

Porous Carbon

According to one aspect of the invention, provided is porous carbon derived from a carbide compound having a composition represented by the following Formula 1:

$$M(C_xO_y)$$ [Formula 1]

(in the Formula 1, M is at least one metal selected from the group consisting of Ti, V, Cr, Zr, Nb, Mo, W, Hf, and Ta; x is 0.6 to 0.99, and y is 0.01 to 0.4).

In the composition of the Formula 1, the metal (M) may be at least one selected from the group consisting of Ti, V, Cr, Zr, Nb, Mo, W, Hf and Ta.

According to one embodiment of the invention, the metal (M) may be Ti.

In the Formula 1, x is the mole ratio of carbon, and may have a broad compositional range because carbon vacancy is stable. And, y is the mole ratio of oxygen, has relatively small compositional range, and if y is greater than 0.4, remaining unreacted oxygen may produce oxides such as $Ti_2O_3$ and the like.

Since the carbide compound having a composition represented by the following Formula 1 allows vacancy according to the size or binding capacity of metal and carbon in the crystal, M:(CxOy) may have a non-stoichimetric composition.

According to one embodiment of the invention, x may be 0.6 to 0.09, preferably 0.6 to 0.9, more preferably 0.6 to 0.8. And, y may be 0.01 to 0.4, preferably 0.1 to 0.4, more preferably 0.2 to 0.4.

According to another embodiment of the invention, the metal (M) may be a composite metal including Ti and other metal (M') atoms, namely, at least one selected from the group consisting of V, Cr, Zr, Nb, Mo, W, Hf, and Ta. Wherein, the carbide compound of the Formula 1 may be represented by the following Formula 1a.

$$(Ti_{1-a}M'_a)(C_xO_y)$$ [Formula 1a]

(in the Formula 1a, M' is at least one metal selected from the group consisting of V, Cr, Zr, Nb, Mo, W, Hf, and Ta; a is 0.01 to 0.3, x is 0.6 to 0.99, and y is 0.01 to 0.4).

In the composition of the Formula 1a, a denotes the mole ratio of M', x denotes the mole ratio of carbon, and y denotes the mole ratio of oxygen.

According to one embodiment of the invention, a may be 0.01 to 0.3, preferably 0.01 to 0.2. And, x may be 0.6 to 0.99, preferably 0.6 to 0.7. And, y may be 0.01 to 0.4, preferably 0.1 to 0.4, more preferably 0.2 to 0.4.

The carbide compound represented by the Formula 1a may be a substitutional solid solution wherein metal (M) includes Ti and at least one selected from the group consisting of Ti, V, Cr, Zr, Nb, Mo, W, Hf, and Ta is substitutionally inserted partially at the Ti site.

According to one embodiment of the invention, the carbide compound of the Formula 1 or Formula 1a may be a solid solution compound consisting only of metal, oxygen and carbon.

According to another embodiment of the invention, the carbide compound may be a substitutional solid solution or an interstitial solid solution wherein in the Formula 1, at least one of hydrogen (H) or boron (B) is substitutionally or interstitially inserted partially at the oxygen site.

In case an oxygen atom is substituted with at least one of hydrogen (H) or boron (B) in the substitutional or interstitial form, the carbide compound may have a composition represented by the following Formula 2. Thus, the porous carbon according to one embodiment of the invention may be porous carbon derived from a carbide compound having a composition represented by the following Formula 2.

$$M(C_xO_yA_z)$$ [Formula 2]

(in the Formula 2, M is at least one metal selected from the group consisting of Ti, V, Cr, Zr, Nb, Mo, W, Hf, and Ta; A is boron (B) or hydrogen (H); X is 0.6 to 0.99, y is 0.01 to 0.4, and z is 0.01 to 0.4).

In the composition of the Formula 2, x denotes the mole ratio of carbon, y denotes the mole ratio of oxygen, and z denotes the mole ratio of boron or hydrogen.

According to one embodiment of the invention, x may be 0.6 to 0.99, preferably 0.6 to 0.7. And, y may be 0.01 to 0.4, preferably 0.1 to 0.4, more preferably 0.2 to 0.4. And, z may be 0.01 to 0.4, preferably 0.01 to 0.3.

The porous carbon of the present invention is carbide derived carbon (CDC). The carbide derived carbon is a carbon prepared by thermochemically reacting a carbide compound with halogen-containing gas to extract atoms other than carbon in the carbide compound, and it exhibits satisfactory physical properties as hydrogen storage material and electrode material compared to the existing activated carbon, and thus, it is drawing attention.

For carbide derived carbon, although porous carbide derived carbon having micropores of 2 nm or less is known, it is not easy to form pores of various sizes including mesopores of a size of 2 nm or more.

As used herein, micropores mean pores having a diameter less than about 2 nm, and mesopores mean pores having a diameter of about 2 nm or more, for example, about 2 to 50 nm.

On the surface of the porous carbon of the present invention, a plurality of pores that include both micropores and mesopores are formed.

As explained above, since the porous carbon of the present invention includes both micropores less than 2 nm and mesopores of 2 nm or more, it may be usefully used in various application fields including the field requiring relatively large pores, for example, storage of larger gas than hydrogen, adsorption body of medical therapeutics or lubricant adsorbent, a catalyst, an electrode of a super capacitor, a filter, and the like, as well as storage and adsorption of small gas such as hydrogen.

And, the volume ratio of the pores including micropores and mesopores may be about 60% or more, for example, about 60 to about 85%, preferably about 70 to about 85%, based on the total volume of the porous carbon. The volume of the pores is measured by introducing nitrogen gas from 0 to 1 atm and converting the amount of adsorbed nitrogen into volume, while maintaining a constant temperature, for example, maintaining 77K using liquid nitrogen. Wherein, the volume ratio of the pores may be calculated by dividing the volume of the pores by the total volume, based on the pores full of gas.

According to one embodiment of the invention, in the porous carbon, micropores having a diameter less than 2 nm may be about 0.001 to about 1.5 cm$^3$/g, preferably about 0.01 to about 1.2 cm$^3$/g, and mesopores having a diameter of 2 nm or more may be about 0.01 to about 2.5 cm$^3$/g, preferably about 0.1 to about 2.3 cm$^3$/g.

According to one embodiment of the invention, the porous carbon may have specific surface area of about 400 m$^2$/g or more, for example, about 400 to about 4,000 m$^2$/g, preferably about 500 to about 3,500 m$^2$/g. The specific surface area may be calculated by the following Formula 1, on the assumption that nitrogen is adsorbed into a monomolecular layer under each pressure condition while introducing nitrogen gas from 0 atm to 1 atm, while maintaining a constant temperature, for example, maintaining 77K using liquid nitrogen.

$$SSA = V_{mono}/22400 * \sigma * N = 4.35 \, V_{mono} \quad \text{[Formula 1]}$$

(SSA=specific surface area[m$^2$/g], $V_{mono}$=measurement volume of nitrogen adsorbed into a monomolecular layer per gram of pore[m$^3$/g], 22400=volume of 1 mol nitrogen[m$^3$/mol], σ=cross sectional area of nitrogen [m$^2$/atom], N=Avogadro's number[atom/mol])

The porous carbon may be obtained by mixing at least one metal source selected from the group consisting of metals selected from Ti, V, Cr, Zr, Nb, Mo, W, Hf, and Ta, and oxides thereof with a carbon source, heating the mixture to form a carbide compound, and extracting atoms other than carbon, as described in detail below.

Preparation Method of Porous Carbon

According to another aspect of the invention, provided is a method for preparing porous carbon comprising the steps of: mixing at least one metal source selected the group of: metals selected from Ti, V, Cr, Zr, Nb, Mo, W, Hf, and Ta, and oxides thereof with a carbon source; heating the mixture to form a carbide compound; reacting the carbide compound with halogen gas; and heating the reaction mixture under hydrogen atmosphere.

According to one embodiment of the invention, the carbide compound may have a composition represented by the following Formula 1.

$$M(C_xO_y) \quad \text{[Formula 1]}$$

In the Formula 1, M is at least one metal selected from the group consisting of Ti, V, Cr, Zr, Nb, Mo, W, Hf, and Ta; x is 0.6 to 0.99, and y is 0.01 to 0.4.

In the composition of the Formula 1, the metal (M) may be at least one selected from the group consisting of Ti, V, Cr, Zr, Nb, Mo, W, Hf and Ta.

According to one embodiment of the invention, the metal (M) may be titanium (Ti).

According to another embodiment of the invention, the metal (M) may be a composite metal including Ti and other metal (M') atoms, namely, at least one selected from the group consisting of V, Cr, Zr, Nb, Mo, W, Hf, and Ta.

Wherein, the carbide compound of the Formula 1 may be represented by the following Formula 1a.

$$(Ti_{1-a}M'_a)(C_xO_y) \quad \text{[Formula 1a]}$$

In the Formula 1a, M' is at least one metal selected from the group consisting of V, Cr, Zr, Nb, Mo, W, Hf, and Ta; a is 0.01 to 0.3, x is 0.6 to 0.99, and y is 0.01 to 0.4.

In the composition of the Formula 1a, a denotes the mole ratio of M', x denotes the mole ratio of carbon, and y denotes the mole ratio of oxygen.

In the carbide compound of the Formula 1 or Formula 1a, the carbide compound may be solid solution powder.

According to one embodiment of the invention, in the step of mixing metal or oxide thereof with a carbon source, a hydrogen (H) or boron (B) source may be further added and mixed. The hydrogen source or boron source may be gas, liquid or solid state element or molecule as long as it includes hydrogen or boron. And, an oxide, a hydrate, or a metal compound and the like may be used without specific limitations as long as it includes hydrogen or boron.

In case a hydrogen (H) or boron (B) source is further added and mixed in the step of mixing metal or oxide thereof with a carbon source, the carbide compound may have a composition represented by the following Formula 2. Thus, the porous carbon according to one embodiment of the invention may be porous carbon derived from a carbide compound having a composition represented by the following Formula 2.

$$M(C_xO_yA_z) \quad \text{[Formula 2]}$$

In the Formula 2, M is at least one metal selected from the group consisting of Ti, V, Cr, Zr, Nb, Mo, W, Hf, and Ta;
A is boron (B) or hydrogen (H);
x is 0.6 to 0.99, y is 0.01 to 0.4, and z is 0.01 to 0.4.

In the composition of the Formula 2, x denotes the mole ratio of carbon, y denotes the mole ratio of oxygen, and z denotes the mole ratio of boron or hydrogen.

The details of the Formulae 1, 1a and 2 are as explained above in the porous carbon.

According to one embodiment of the invention, simultaneously with or after the step of mixing at least one metal source selected from the group consisting of metals and oxides thereof with a carbon source, a pulverization process may be conducted. The pulverization process may be conducted, for example, using a high energy ball mill. By using the high energy ball mill, the mixture of a metal source and a carbon source may be more uniformly mixed, and since the mixture is pulverized with higher energy than a common ball mill, the amount of defects may be increased to stably prepare carbide solid solution powder at a temperature of about 800 to about 1,600° C., which is lower than the common carbide powder preparation temperature of about 1,700 to about 2,200° C.

When pulverization is conducted using the high energy ball mill, for example, means such as an attritor mill, a planetary mill or a horizontal mill and the like may be used, and it is preferable to conduct dry pulverization at a BPR (ball-to-power ratio) of about 10:1 or more, and a milling speed of about 50 rpm or more.

The step of heating the mixture to form a carbide compound may be conducted at a temperature of about 800 to about 1,600° C., preferably about 1,300 to about 1,500° C. for about 5 minutes to about 5 hours, preferably about 1 hour to about 2 hours.

The step of reacting the carbide compound with halogen gas to form porous carbon may be conducted at a temperature of about 400 to about 1,200° C., preferably about 400 to about 800° C. for about 1 to about 5 hours, preferably about 1 to about 3 hours. Wherein, the halogen gas used may be preferably chlorine gas.

By reacting the carbide compound with halogen gas, most metals (M), oxygen, boron and hydrogen other than carbon are extracted in the carbide compound, thus forming pores at the sites of these atoms, thereby obtaining porous carbon.

After reacting the carbide compound with halogen gas, the step of heating under hydrogen atmosphere is conducted. The step of heating under hydrogen atmosphere may be conducted at a temperature of about 400 to about 1,000° C., preferably about 400 to about 800° C., whereby remaining halogen gas may be removed.

And, according to one embodiment of the invention, after the step of heating under hydrogen atmosphere to remove remaining halogen gas, the step of activating pores may be further conducted.

By conducting the step of activating pores, more pores may be generated on the surface, or the diameter of pores may be increased, thus more increasing surface area per unit mass. However, the conventional pore activation process using carbon dioxide may cause significant mass loss because carbon is decomposed during the activation process.

According to one embodiment of the invention, the step of activating pores may be conducted by heating porous carbon powder until a specific temperature, for example, about 25 to about 1,000° C. is reached, in the atmosphere of at least one gas selected from the group consisting of inert gas such as He or Ar and $N_2$ gas, and heating at the reached temperature for a specific time, for example, about 10 minutes to about 2 hours, using carbon dioxide gas ($CO_2$). By conducting pore activation using inert gas before introducing carbon dioxide, pore activation may be effectively achieved while reducing carbon loss.

Hereinafter, the present invention will be explained in detail with reference to the following examples. However, these examples are only to illustrate the invention, and the scope of the invention is not limited thereto.

EXAMPLE

Example 1

18.7848 g of $TiO_2$ and 6.2152 g of carbon powder were prepared and mixed.

The mixture was dry-pulverized with a Planetary mill at 250 rpm at BPR (Ball-to-Powder Ratio) of 30:1 for 20 hours using a YSZ (Yittrium Stabilized Zirconia) ball.

After the milling was completed, the pulverized mixture was heated under vacuum at 1,500° C. for 2 hours using a graphite vacuum furnace to prepare carbide compound powder having a composition of $Ti(C_{0.648}O_{0.273})$ through reduction and carbonization processes.

3.00 g of the prepared carbide compound powder was treated with chlorine gas at 800° C. for 3 hours, and then, heated at 600° C. for 2 hours under hydrogen atmosphere, thereby removing remaining chlorine gas to obtain porous carbon powder.

Examples 2 to 4

Porous carbon powder was prepared by the same method as Example 1, except changing the amounts of $TiO_2$ and carbon powder.

The amount of raw materials used and the resulting compositions of the carbide compounds are shown in the following Table 1.

And, the specific surface area (SSA), the volume of micropores and the volume of mesopores of the porous carbon according to each Example are also shown in the following Table 1.

Comparative Example 1

3.00 g of commercially available TiC powder (Aldrich, 1-3 μm) was treated with chlorine gas at 800° C. for 3 hours, and then, heated under hydrogen atmosphere at 600° C. for 2 hours, thereby removing remaining chlorine gas to prepare porous carbon powder.

TABLE 1

| Example No. | Composition of carbide compound | Raw materials $TiO_2$ (unit: g) | Raw materials C (unit: g) | SSA (unit: $m^2/g$) | Volume of micropores (unit: $cm^3/g$) | Volume of mesopores (unit: $cm^3/g$) |
|---|---|---|---|---|---|---|
| 1 | $Ti(C_{0.648}O_{0.273})$ | 18.7848 | 6.2152 | 1607 | 0.523 | 0.311 |
| 2 | $Ti(C_{0.753}O_{0.231})$ | 18.3697 | 6.6303 | 2574 | 0.9344 | 0.3384 |
| 3 | $Ti(C_{0.827}O_{0.167})$ | 17.9725 | 7.0275 | 1914 | 0.7299 | 0.1775 |
| 4 | $Ti(C_{0.954}O_{0.118})$ | 17.5921 | 7.4079 | 1621 | 0.5982 | 0.1154 |
| Comparative Example 1 | TiC | TiC 3.00 g | | 1512 | 0.6 | 0.04 |

From the Table 1, it can be seen that total specific surface area (SSA) is in proportion to the volume of micropores.

The maximum value of the micropores, mesopores and specific surface area was obtained in Example 2 that is derived from a carbide compound having a C:O composition of 0.753:0.231.

Figure 1:
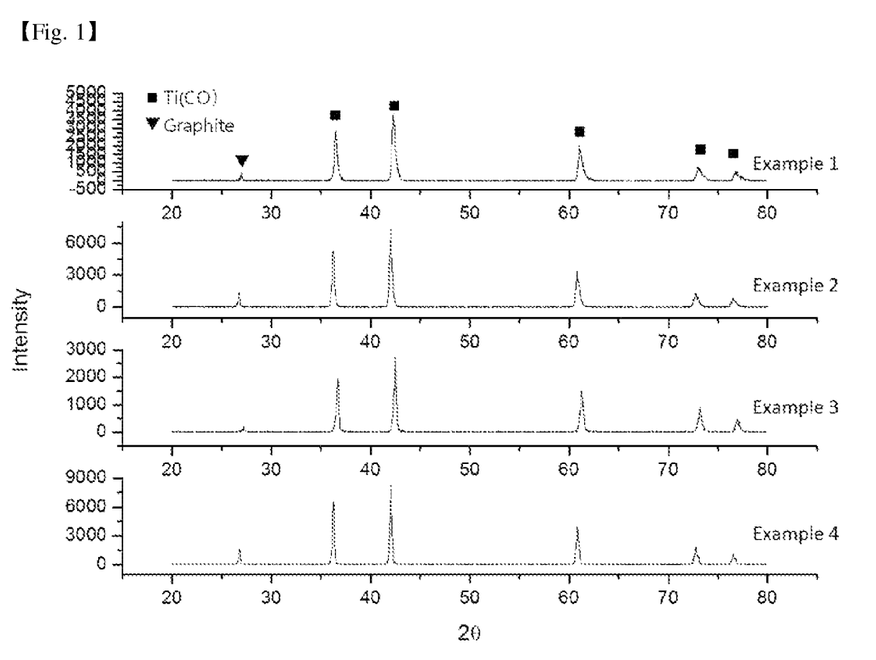
FIG. 1 is a graph showing the XRD results of the carbide compounds prepared according to Examples 1 to 4.

FIG. 1 shows the XRD results of the carbide compounds prepared according to Examples 1 to 4.

Referring to FIG. 1, it can be seen that only Ti (CO) phase and graphite phase exist.

Figure 2:
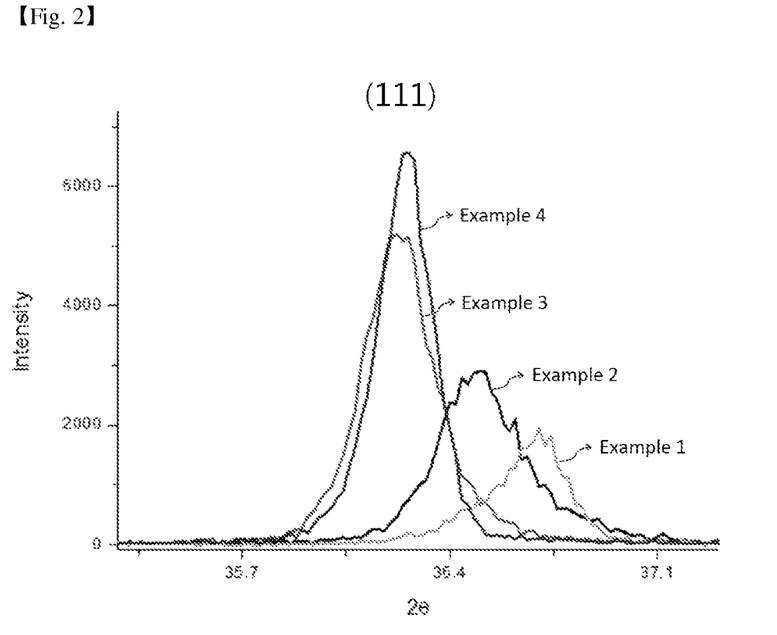
FIG. 2 is a graph showing the (111) peak shifts in the XRDs of the carbide compounds prepared according to Examples 1 to 4.

FIG. 2 shows (111) peak shifts in the XRDs of the carbide compounds prepared according to Examples 1 to 4.

Referring to FIG. 2, it can be seen that although lattice constant of crystal changes in proportion to the fraction of carbon and oxygen in the porous carbon, even if oxygen content in the carbide composition increases from about 0.1 to about 0.3, only the interval in the crystal changes without change in the crystal structure.

Figure 3A:
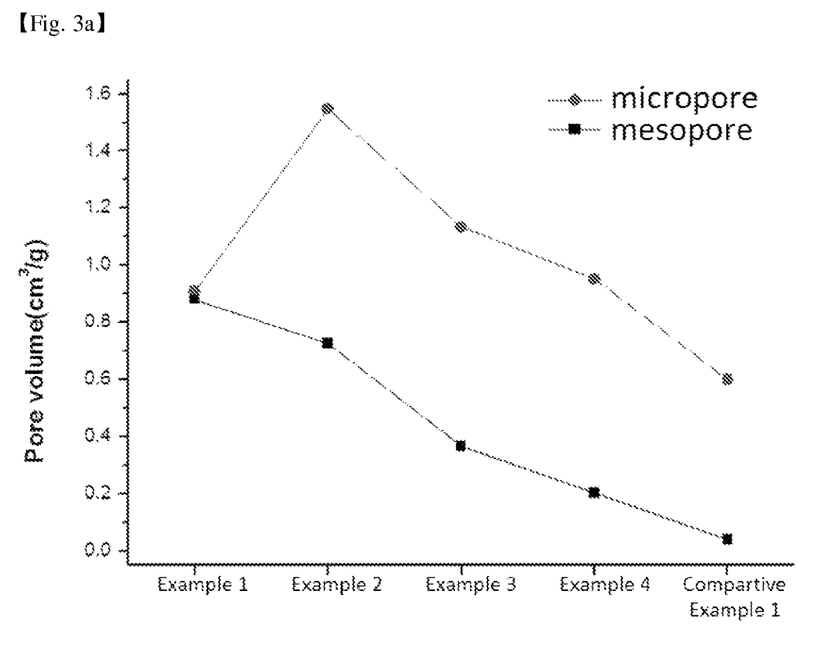
FIG. 3a is a graph showing the volumes of the micro- and mesopores of the porous carbons prepared according to Examples 1 to 4 and Comparative Example 1.

FIG. 3a is a graph showing the volume of micropores and mesopores of the porous carbons prepared according to Examples 1 to 4 and Comparative Example 1.

Figure 3B:
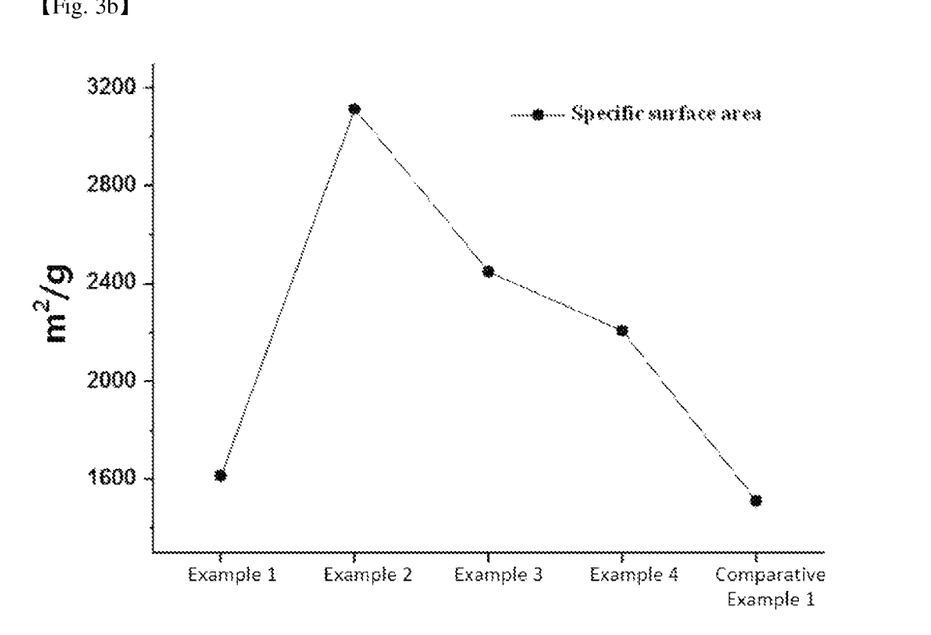
FIG. 3b is a graph showing the specific surface areas of the porous carbons prepared according to Examples 1 to 4 and Comparative Example 1.

FIG. 3b is a graph showing specific surface areas of the porous carbons prepared according to Examples 1 to 4 and Comparative Example 1.

Referring to FIGS. 3a and 3b, it can be seen that as oxygen content in the composition of porous carbon increases from Example 1 to 4, the amount of micropores increases, and that Example 2 having the mole fraction of oxygen of about 0.231 exhibits maximum pore volume and specific surface area.

Examples 5 to 8

To prepare porous carbon from a carbide compound that is a solid solution in which boron (B) is substitutionally inserted, 18.2108 g of $TiO_2$, 0.158 g of $B_2O_3$, and 6.6305 g of carbon powder were prepared and mixed.

Thereafter, remaining processes were conducted by the same method as Example 1, to prepare porous carbon powder of Example 5.

For Examples 6 to 8, carbide compounds were prepared while changing the contents of $B_2O_3$, and then, porous carbon powders were prepared by the same method as Example 1.

The amounts of raw materials used and the resulting composition of carbide compounds are shown in the following Table 2.

And, the specific surface area (SSA), the volume of micropores and the volume of mesopores of the porous carbons according to each Example were measured, and the results are also shown in the following Table 2.

Figure 4:
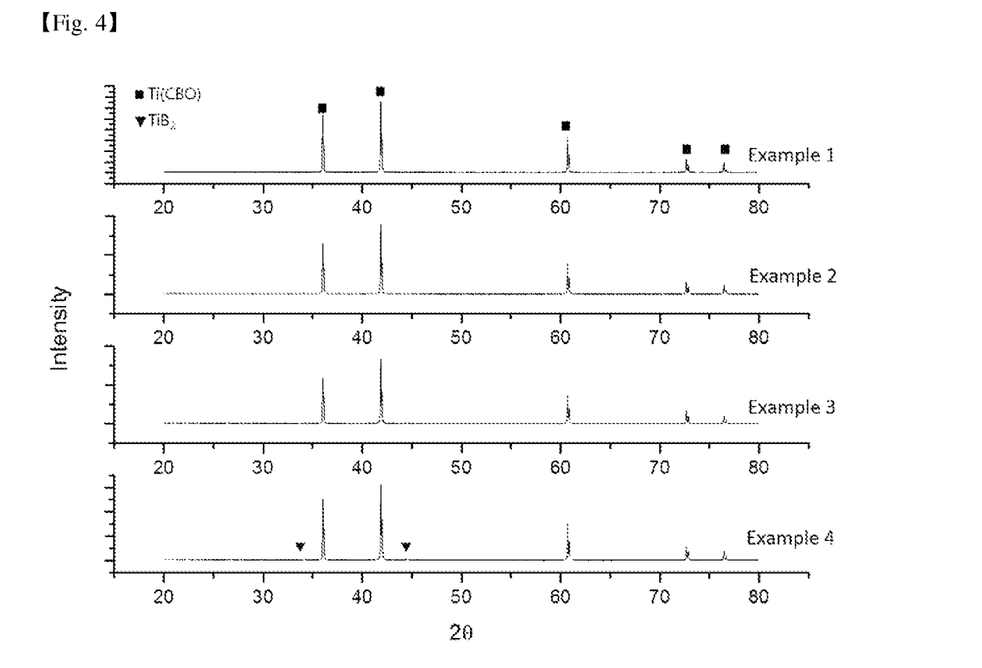
FIG. 4 is a graph showing the XRD results of the carbide compounds prepared according to Examples 5 to 8.

FIG. 4 is a graph showing the XRD results of the carbide compounds prepared according to Examples 5 to 8.

Figure 5:
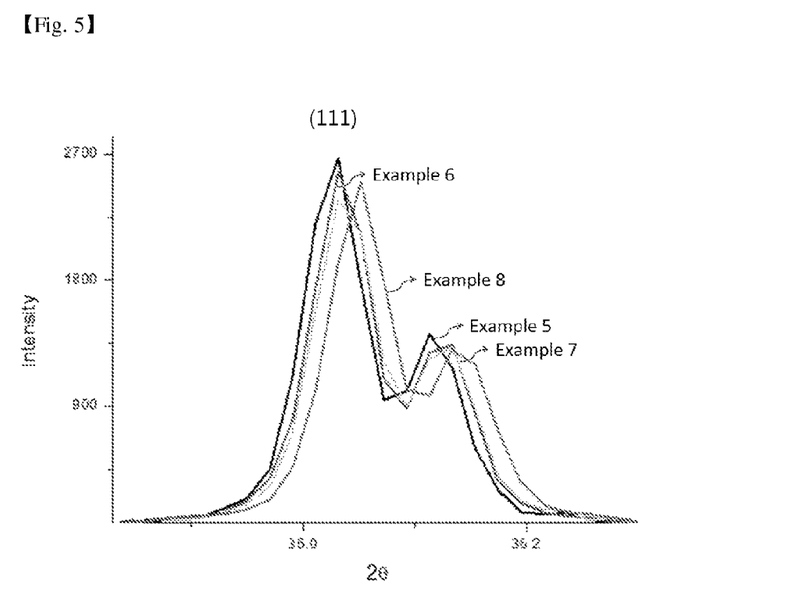
FIG. 5 is a graph showing the (111) peak shifts according to the change in lattice constant in the XRDs of the carbide compounds prepared according to Examples 5 to 8.

FIG. 5 is a graph showing (111) peak shifts according to change in lattice constant in the XRDs of the carbide compounds prepared according to Examples 5 to 8.

Referring to FIGS. 4 and 5, it can be seen that even if boron content increases in Examples 5 to 8, only the interval in the crystal changes without change in the crystal structure. Thus, it can be seen that the carbide compounds are solid solutions in which boron is substitutionally inserted.

Figure 6A:
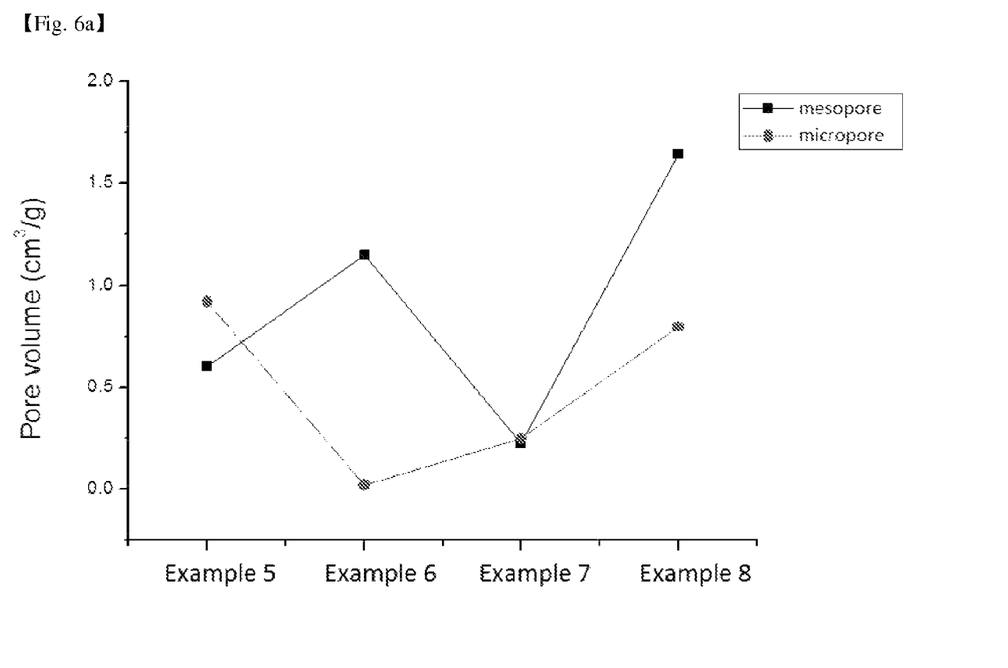
FIG. 6a is a graph showing the volumes of the micro- and mesopores of the porous carbons prepared according to Examples 5 to 8.

FIG. 6a is a graph showing the volumes of micropores and mesopores of the porous carbons prepared according to Examples 5 to 8.

Figure 6B:
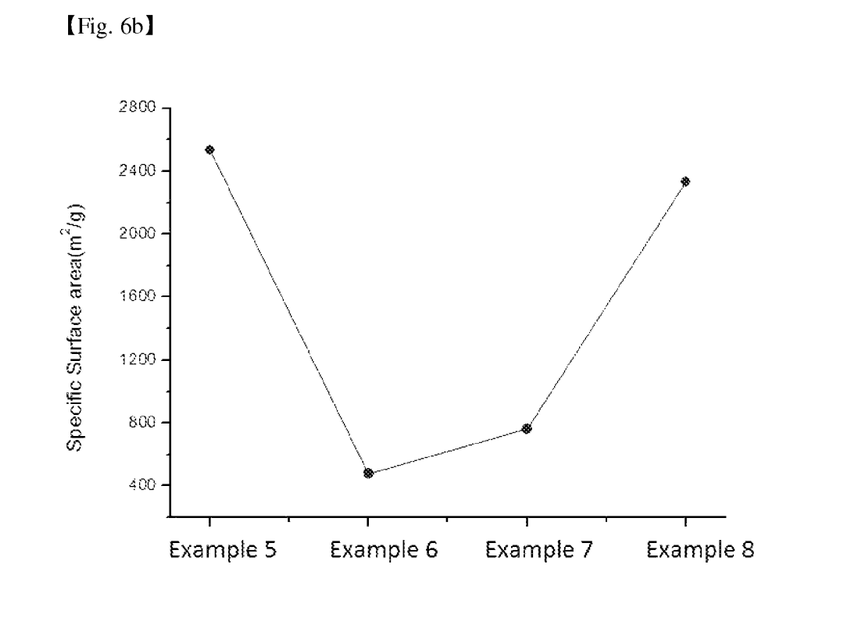
FIG. 6b is a graph showing the specific surface areas of the porous carbons prepared according to Examples 5 to 8.

FIG. 6b is a graph showing the specific surface areas of the porous carbons prepared according to Examples 5 to 8.

FIGS. 6a and 6b show that in case porous carbon is obtained from a carbide compound solid solution in which boron is substitutionally inserted, the volumes of mesopores remarkably increase except Example 7. It may be interpreted that if an appropriate amount of boron exists, it is evaporated in a gas phase together with oxygen in the process of preparing porous carbon. However, it was difficult to find out a tendency according to the compositional ratio due to the complexity of evaporation.

Examples 9 to 14

To prepare porous carbon from a solid solution carbide compound in which hydrogen (H) is interstitially inserted, 18.3335 g of $TiO_2$, 0.0575 g of $TiH_2$ and 6.6089 g of carbon powder were prepared and mixed.

Thereafter, remaining processes were conducted by the same method as Example 1, to prepare porous carbon powder of Example 9.

For Examples 10 to 14, carbide compounds were prepared while changing the contents of $TiH_2$, and then, porous carbon powders were prepared by the same method as Example 1.

The amounts of raw materials used and the resulting compositions of the carbide compounds are shown in the following Table 3.

TABLE 2

| Example No. | Composition of carbide compound | Raw materials | | | SSA ($m^2/g$) | Volume of micropores ($cm^3/g$) | Volume of mesopores ($cm^3/g$) |
|---|---|---|---|---|---|---|---|
| | | $TiO_2$ | $B_2O_3$ (g) | C (g) | | | |
| 5 | $Ti(C_{0.686}B_{0.02}O_{0.294})$ | 18.2108 | 0.1586 | 6.6305 | 2534.6 | 0.9196 | 0.6014 |
| 6 | $Ti(C_{0.672}B_{0.04}O_{0.308})$ | 18.0527 | 0.3146 | 6.6326 | 476.55 | 0.0129 | 1.1478 |
| 7 | $Ti(C_{0.658}B_{0.06}O_{0.322})$ | 17.8973 | 0.4678 | 6.6347 | 762.6 | 0.249 | 0.2249 |
| 8 | $Ti(C_{0.644}B_{0.08}O_{0.336})$ | 17.7446 | 0.6184 | 6.6368 | 2331 | 0.7955 | 1.641 |

TABLE 3

| Example No. | Composition of carbide compound | Raw materials | | | SSA (unit: m²/g) | Volume of micropores (unit: cm³/g) | Volume of mesopores (unit: cm³/g) |
|---|---|---|---|---|---|---|---|
| | | $TiO_2$ (g) | $TiH_2$ (g) | C (g) | | | |
| 9 | $Ti(C_{0.730}H_{<0.01>}O_{0.306})$ | 18.3335 | 0.0575 | 6.6089 | 469.12 | 0.0028 | 0.2156 |
| 10 | $Ti(C_{0.700}H_{<0.03>}O_{0.330})$ | 18.2563 | 0.1736 | 6.5699 | 2566.5 | 0.8865 | 0.4461 |
| 11 | $Ti(C_{0.667}H_{<0.05>}O_{0.319})$ | 18.1783 | 0.2911 | 6.5305 | 3053.1 | 1.0494 | 1.0847 |
| 12 | $Ti(C_{0.655}H_{<0.07>}O_{0.336})$ | 18.0994 | 0.4099 | 6.4906 | 662.8 | 0.2451 | 0.0978 |
| 13 | $Ti(C_{0.691}H_{<0.10>}O_{0.336})$ | 17.9792 | 0.5909 | 6.4298 | 2553.2 | 0.8366 | 0.4527 |
| 14 | $Ti(C_{0.617}H_{<0.30>}O_{0.331})$ | 17.1186 | 1.8867 | 5.9945 | 2468.3 | 0.8754 | 0.8653 |

Figure 7:
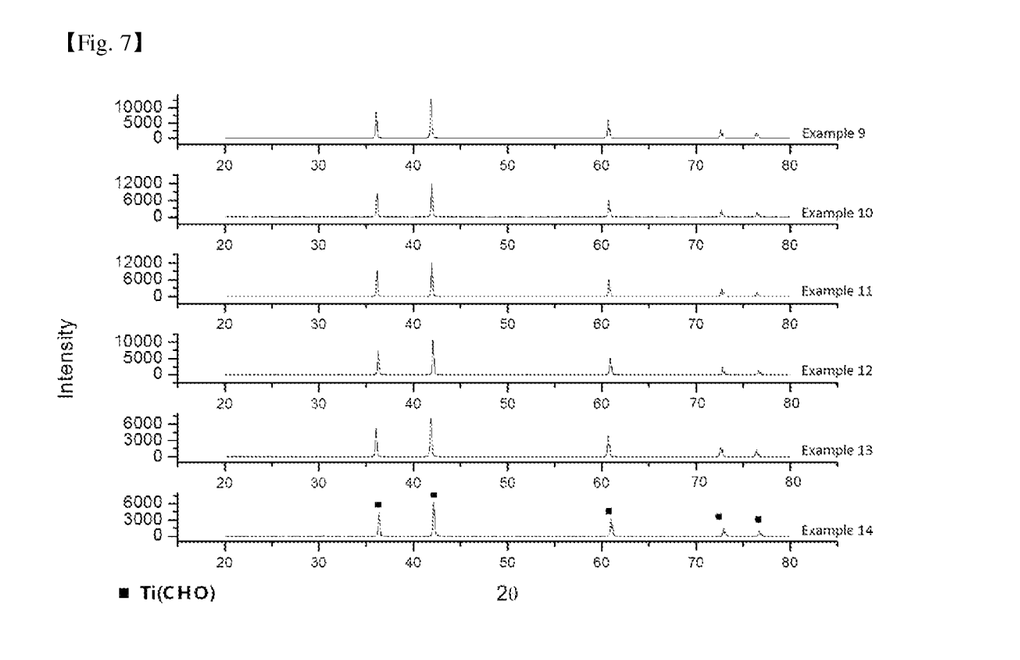
FIG. 7 is a graph showing the XRD results of the carbide compounds prepared according to Examples 9 to 14.

FIG. 7 is a graph showing the XRD results of the carbide compounds prepared according to Examples 9 to 14.

Figure 8:
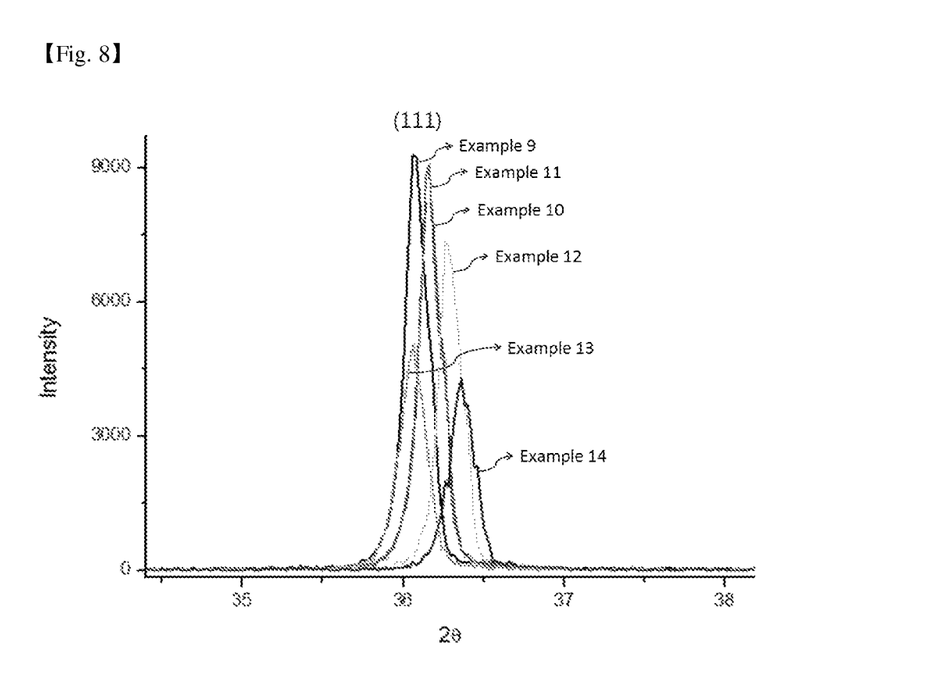
FIG. 8 is a graph showing the (111) peak shifts in the XRDs of the carbide compounds prepared according to Examples 9 to 14.

FIG. 8 is a graph showing (111) peak shifts in the XRDs of the carbide compounds prepared according to Examples 9 to 14.

Referring to FIGS. 7 and 8, it can be seen that in Examples 9 to 14, even if oxygen contents increase, only lattice constant change without change in the crystal structure.

Figure 9A:
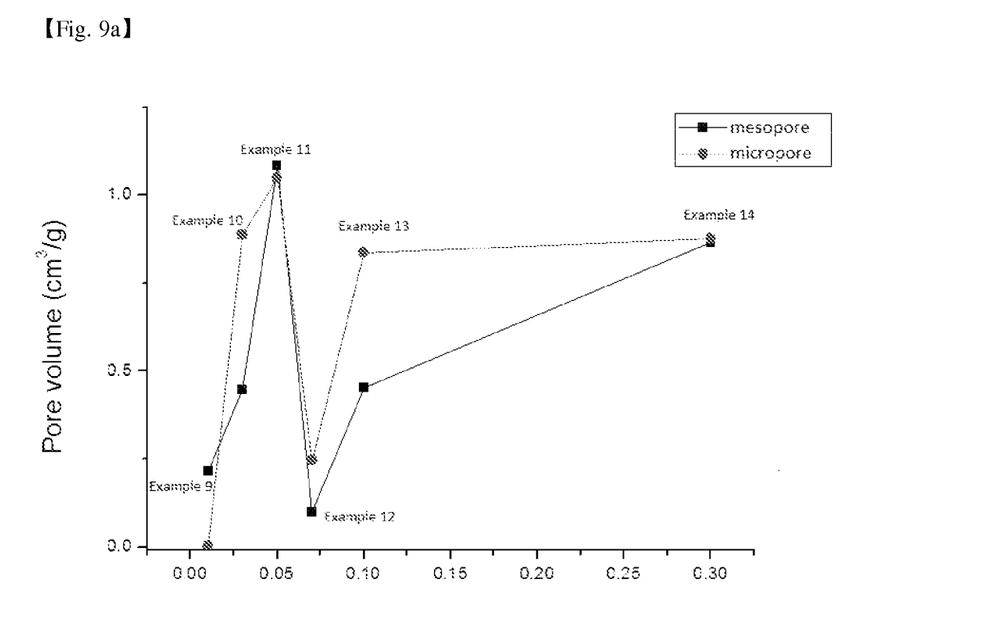
FIG. 9a is a graph showing the volumes of the micro- and mesopores of the porous carbons prepared according to Examples 9 to 14.

FIG. 9a is a graph showing the volumes of micropores and mesopores of the porous carbons prepared according to Examples 9 to 14.

Figure 9B:
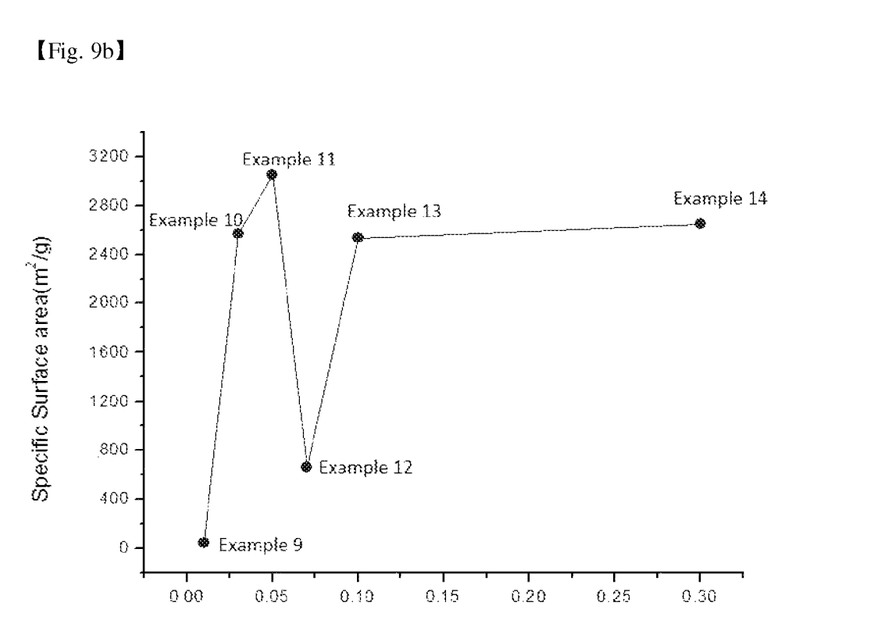
FIG. 9b is a graph showing the specific surface areas of the porous carbons prepared according to Examples 9 to 14.

FIG. 9b is a graph showing the specific surface areas of the porous carbons prepared according to Example 9 to 14.

Referring to FIGS. 9a and 9b, it can be seen that in the porous carbon powders prepared according to Examples 9 to 14, both micropores and mesopores are present. Particularly, such a phenomenon is apparent in Example 11 having a composition of $Ti(C_{0.665}H_{<0.05>}O_{0.285})$

Example 15

To prepare porous carbon from a solid solution carbide compound in which tungsten (W) is substitutionally inserted at the titanium (Ti) site, 12.9607 g of $TiO_2$, 5.1294 g of $WO_3$ and 6.9104 g of carbon powder were prepared and mixed.

Thereafter, remaining processes were conducted by the same method as Example 1, to prepare porous carbon powder.

The specific surface area (SSA), volume of micropores and volume of mesopores of the porous carbon are shown in the following Table 4, in comparison to Comparative Example 1 and Example 4.

According to the result, Example 15 is more excellent in terms of specific surface area, microporosity and mesoporosity than Comparative Example 1. And, it is shown that the porous carbon prepared from a carbide compound in which tungsten (W) is substitutionally inserted may be more favorable in terms of increase in specific surface area and multiporosity than Example 14 that uses only titanium (Ti) as a metal atom.

TABLE 4

| Example No. | Composition of carbide compound | SSA (unit: m²/g) | Volume of total pores (unit: cm³/g) | Volume of micropores (unit: cm³/g) | Volume of mesopores (unit: cm³/g) |
|---|---|---|---|---|---|
| Comparative Example 1 | TiC | 1512.0 | 0.64 | 0.6 | 0.04 |
| Example 4 | $Ti(C_{0.954}O_{0.118})$ | 1621 | 0.75150 | 0.5982 | 0.1154 |
| Example 15 | $(Ti_{0.88}W_{0.12})(C_{0.893}O_{0.072})$ | 1778.4 | 1.0665 | 0.7550 | 0.3594 |

Example 16

Carbide compound powder having a composition of $Ti(C_{0.827}O_{0.167})$ that was prepared by the same method as Example 1 was treated with chlorine gas at 1,000° C. for 3 hours, and then, heated at 600° C. for 2 hours, thereby removing remaining chlorine gas to obtain porous carbon powder.

Example 17

The porous carbon powder obtained in Example 16 was heated under He atmosphere, and when a temperature of 970° C. was reached, a pore activation process was conducted by flowing $CO_2$ at 30 sccm for 30 minutes.

The specific surface areas (SSA), volumes of micropores, and volumes of mesopores of the porous carbons according to Examples 16 and 17 were measured, and the results are shown in the following Table 5.

TABLE 5

| Example No. | Composition of carbide compound | SSA (unit: m²/g) | Volume of micropores (unit: cm³/g) | Volume of mesopores (unit: cm³/g) |
|---|---|---|---|---|
| Example 16 | $Ti(C_{0.827}O_{0.167})$ | 2290.9 | 1.14 | 0.50 |
| Example 17 | $Ti(C_{0.827}O_{0.167})$ | 1729.3 | 0.73 | 2.27 |

As shown, according to the activation process of the present invention, by using inert gas such as He, $N_2$ and the like as temperature elevating atmosphere, carbon loss may be reduced, and remarkable $CO_2$ activation effect for increasing mesopores is exhibited.

According to the conventional pore activation process, $CO_2$ gas was flowed from room temperature, and during the activation process at 970° C. for 2 hours, about 70% carbon loss occurred, while according to the activation process of the present invention, even though $CO_2$ activation was conducted only for 30 minutes at 970° C., less carbon loss, for example, about 60% carbon loss occurred, and mesopores could be effectively increased.

The invention claimed is:

1. A method for preparing porous carbon comprising:
a step of mixing at least one metal source with a carbon source, wherein the metal source is a metal selected from the group consisting of Ti, V, Cr, Zr, Nb, Mo, W, Hf, Ta, and oxides thereof;
a step of heating the mixture to form a carbide compound;
a step of reacting the carbide compound with halogen gas; and
a step of heating the reaction mixture under hydrogen atmosphere,
wherein the carbide compound has a composition represented by the following Formula 1:

$$M(C_xO_y) \quad \text{[Formula 1]}$$

in the Formula 1, M is at least one metal selected from the group consisting of Ti, V, Cr, Zr, Nb, Mo, W, Hf, and Ta;
x is 0.6 to 0.99, and y is 0.01 to 0.4.

2. The method according to claim 1, further comprising a step of pulverizing the mixture, simultaneously with or after the step of mixing a metal source with a carbon source.

3. The method according to claim 2, wherein the step of pulverizing the mixture is conducted using an attritor mill, a planetary mill or a horizontal mill, at a BPR (ball-to-power ratio) of about 10:1 or more, and a milling speed of about 50 rpm or more.

4. The method according to claim 1, wherein the step of heating the mixture to form a carbide compound is conducted at a temperature of 800 to 1,600° C. for 5 minutes to 5 hours.

5. The method according to claim 1, wherein the halogen gas is chlorine ($Cl_2$) gas.

6. The method according to claim 1, wherein the step of reacting a carbide compound with halogen gas is conducted at a temperature of 400 to 1,200° C. for 1 to 5 hours.

7. The method according to claim 1, wherein the step of heating the reaction mixture under hydrogen atmosphere is conducted at a temperature of 400 to 1,000° C.

8. The method according to claim 1, further comprising a step of activating pores, after the step of heating under hydrogen atmosphere.

9. The method according to claim 8, wherein the step of activating pores comprises
heating the porous carbon under atmosphere of at least one gas selected from the group consisting of inert gas and $N_2$ gas; and
flowing carbon dioxide gas ($CO_2$) at the heated temperature.

10. A method for preparing porous carbon comprising:
a step of mixing at least one metal source with a carbon source, and a hydrogen (H) source or a boron (B) source, wherein the metal source is a metal selected from the group consisting of Ti, V, Cr, Zr, Nb, Mo, W, Hf, Ta, and oxides thereof;
a step of heating the mixture to form a carbide compound;
a step of reacting the carbide compound with halogen gas; and
a step of heating the reaction mixture under hydrogen atmosphere,
wherein the carbide compound has a composition represented by the following Formula 2:

$$M(C_xO_yA_z) \quad \text{[Formula 2]}$$

in the Formula 2, M is at least one metal selected from the group consisting of Ti, V, Cr, Zr, Nb, Mo, W, Hf, and Ta;
A is boron (B) or hydrogen (H);
x is 0.6 to 0.99, y is 0.01 to 0.4, and z is 0.01 to 0.4.

* * * * *